US011487714B2

(12) United States Patent
Beier et al.

(10) Patent No.: US 11,487,714 B2
(45) Date of Patent: Nov. 1, 2022

(54) DATA REPLICATION IN A DATA ANALYSIS SYSTEM

(71) Applicant: INTERNATIONAL BUSINESS MACHINES CORPORATION, Armonk, NY (US)

(72) Inventors: Felix Beier, Haigerloch (DE); Dennis Butterstein, Stuttgart (DE); Einar Lueck, Filderstadt (DE); Sabine Perathoner-Tschaffler, Nufringen (DE); Daniel Martin, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/830,570

(22) Filed: Mar. 26, 2020

(65) Prior Publication Data

US 2020/0364185 A1   Nov. 19, 2020

(30) Foreign Application Priority Data

May 15, 2019   (EP) .................................... 19174602

(51) Int. Cl.
*G06F 16/00* (2019.01)
*G06F 16/182* (2019.01)
(Continued)

(52) U.S. Cl.
CPC .......... *G06F 16/184* (2019.01); *G06F 16/178* (2019.01); *G06F 16/1805* (2019.01)

(58) Field of Classification Search
CPC .. G06F 16/184; G06F 16/178; G06F 16/1805; G06F 17/30212; G06F 17/30578;
(Continued)

(56) References Cited

U.S. PATENT DOCUMENTS 6,233,585 B1   5/2001   Gupta
6,434,568 B1   8/2002   Bowman-Amuah
(Continued)

FOREIGN PATENT DOCUMENTS

CN   109241175 A   1/2019

OTHER PUBLICATIONS

Oracle, "Oracle GoldenGate", printed Jan. 22, 2020, 6 pages, https://www.oracle.com/middleware/technologies/goldengate.html.
(Continued)

*Primary Examiner* — Ashish Thomas
*Assistant Examiner* — Suman Rajaputra
(74) *Attorney, Agent, or Firm* — Anthony M. Pallone

(57) ABSTRACT

The present disclosure relates to a method for data replication in a data analysis system (100). A source database system (101) of the data analysis system (100) comprises a transaction log (106) storing log records generated by database transactions. The method comprises in response to determining (303) that a received log record is generated by a database transaction that rolls back a change of another database transaction whose log records are buffered in at least one record buffer, data indicative of a log record generated by the other database transaction buffering (305) in the compensation buffer tag data. The tag data may be used (311) for replicating to a target database system of the data analysis system buffered log records of the record buffer which are not marked as compensation records.

17 Claims, 4 Drawing Sheets

(51) Int. Cl.
*G06F 16/18* (2019.01)
*G06F 16/178* (2019.01)

(58) Field of Classification Search
CPC ......... G06F 17/30067; G06F 17/30094; G06F 17/30569
See application file for complete search history.

(56) References Cited

U.S. PATENT DOCUMENTS

| | | | |
|---|---|---|---|
| 6,507,875 B1 | 1/2003 | Mellen-Garnett | |
| 7,117,221 B2 | 10/2006 | Hahn | |
| 9,501,501 B2 | 11/2016 | Madhavarapu et al. | |
| 10,180,946 B2 | 1/2019 | Brodt et al. | |
| 2011/0099149 A1* | 4/2011 | Kim | G06F 11/1471 707/687 |
| 2014/0040209 A1 | 2/2014 | Parag | |
| 2016/0328461 A1* | 11/2016 | Ahmed | G06F 16/27 |
| 2017/0185493 A1 | 6/2017 | Graefe | |
| 2017/0329836 A1 | 11/2017 | Simitsis et al. | |
| 2017/0364571 A1* | 12/2017 | Lu | G06F 16/2358 |
| 2018/0046554 A1 | 2/2018 | Griffith et al. | |
| 2019/0361913 A1* | 11/2019 | Yoon | G06F 16/1858 |
| 2020/0034077 A1 | 1/2020 | Haravu | |
| 2020/0042183 A1 | 2/2020 | Meiri | |
| 2020/0272603 A1* | 8/2020 | Matters | G06F 11/2025 |
| 2021/0103502 A1* | 4/2021 | Gurajada | G06F 11/1474 |

OTHER PUBLICATIONS

PostgreSQL, "Documentation: 9.1: Log-Shipping Standby Servers", Nov. 14, 2019, Chapter 25, High Availability, Load Balancing, and Replication, 3 pages.

Holliday et al., "Database Replication Using Epidemic Communication", Euro-Par 2000, LNCS 1900, pp. 427-434, 2000.

IBM: List of IBM Patents or Patent Applications Treated as Related (Appendix P), Mar. 27, 2020, pp. 1-2.

Pending U.S. Appl. No. 16/830,624, filed Mar. 26, 2020, entitled: "Method for Data Synchronization in a Data Analysis System", pp. 1-37.

Pending U.S. Appl. No. 16/830,696, filed Mar. 26, 2020, entitled: "Method for Data Synchronization Between a Source Database System and Target Database System", pp. 1-42.

Ben-Gan et al., "Aggregating and Pivoting Data," Chapter 6, Inside Microsoft SQL Server(D cent-symbol) 2005: T-SQL Querying 2006, Microsoft Press, p315+Bib Data, pp. 315-380.

Microsoft KB Archive/238254, INF: Update Statements May be Replicated as Delete/Insert Pairs, Nov. 21, 2003, betaarchive.com, https://www.betaarchive.com/wiki/index.php?title=Microsoft_KB_Archive/238254, 2 pages.

PITR-CH, "Thread Pools," Aug. 13, 2018, Github, https://github.com/ruby-concurrency/concurrent-ruby/blob/master/docs-source/thread_pools.md, 7 pages.

Stack Exchange, What is a thread pool? Software Engineering Stack Exchange, Accessed: Sep. 21, 2021, https://softwareengineering.stackexchange.com/questions/173575/what-is-a-thread-pool, 4 pages.

Beier et al., "Cleaning Compensated Change Records in Transaction Logs," Application and Drawings, Filed on Feb. 5, 2021, 35 Pages, U.S. Appl. No. 17/168,825.

Beier et al., "Method for Data Replication in a Data Analysis System," European Application No. 19174602.3, Application and Drawings, 31 pages.

IBM: List of IBM Patents or Patent Applications Treated as Related (Appendix P), Mar. 1, 2022, pp. 1-2.

Kholsa, "Database Net Services Administrator's Guide," Oracle Sys, 12c, Release 1, Jul. 2017, https ://docs.oracle.com/database/121/NETAG/dispatcher.htm#NETAGO12, 5 pages.

Martin et al., "Method for Data Synchronization in a Data Analysis System," European Application No. 19174606.4 , Application and Drawings, 31 pages.

Stolze et al., "Method for Data Synchronization Between a Source Database System and Target Database System," European Application No. 19174608.0, Application and Drawings, 34 pages.

Kreps, "The Log: What every software engineer should know about real-time data's unifying abstraction," LinkedIn, https://engineering.linkedin.com/distributed-systems/log-what-every-software-engineer-should-know-about-real-time-datas-unifying, 30 pages.

Prasoon, "Hashtable Sorting," https://www.c-sharpcorner.com/uploadfile/prasoonk/hashtable-sorting/, Apr. 30, 2009, 7 pages.

* cited by examiner

DATA REPLICATION IN A DATA ANALYSIS SYSTEM

BACKGROUND

The present invention relates to the field of digital computer systems, and more specifically, to a method for data replication in a data analysis system.

Many systems exist for moving data from one relational system to another. These systems can be classified into two categories: full refresh systems that copy entire data sets and change data capture (CDC) systems that optimize transfers by applying changes only. CDC systems enable a change data capture service such that only the data in a source system of the CDC system that has actually changed are updated in a target system of the CDC system.

BRIEF SUMMARY

Various embodiments provide a method for data replication in a data analysis system, computer system and computer program product as described by the subject matter of the independent claims. Advantageous embodiments are described in the dependent claims. Embodiments of the present invention can be freely combined with each other if they are not mutually exclusive.

In one aspect, the invention relates to a method for data replication (or for data synchronization between a source database system and a target database system of the data analysis system) in a data analysis system, system, a source database system of the data analysis system comprising a transaction log storing log records generated by database transactions. The method comprises:
  a) providing at least one record buffer and a compensation buffer;
  b) receiving a log record of the transaction log;
  c) in response to determining that the received log record is generated by a database transaction that rolls back a change of another database transaction whose log records are buffered in the at least one record buffer, buffering in the compensation buffer tag data indicative of a log record generated by the other database transaction, thereby marking the log record of the other database transaction as a compensation record; otherwise buffering the received log record in the at least one record buffer; repeating receiving step b) and determining step c) for further received log records;
  d) using the tag data for replicating to a target database system of the data analysis system buffered log records of the record buffer which are not marked as compensation records.

In another aspect, the invention relates to a control system for data replication in a data analysis system, a source database system of the data analysis system comprising a transaction log storing log records generated by database transactions. The control system is configured for:
  1) receiving a log record of the transaction log;
  2) in response to determining that the received log record is generated by a database transaction that rolls back a change of another database transaction whose log records are buffered in the at least one record buffer, buffering in a compensation buffer tag data indicative of a log record generated by the other database transaction, thereby marking the log record of the other database transaction as a compensation record; otherwise buffering the received log record in at least one record buffer; repeating steps 1) and 2) for further received log records;
  3) using the tag data for replicating to a target database system of the data analysis system buffered log records of the record buffer which are not marked as compensation records.

In another aspect, the invention relates to a computer program product comprising a computer-readable storage medium having computer-readable program code embodied therewith, the computer-readable program code configured for data replication in a data analysis system, a source database system of the data analysis system comprising a transaction log storing log records generated by database transactions, the computer-readable program code further configured for:
  1) receiving a log record of the transaction log;
  2) in response to determining that the received log record is generated by a database transaction that rolls back a change of another database transaction, buffering in a compensation buffer tag data indicative of a log record generated by the other database transaction whose log records are buffered in the at least one record buffer, thereby marking the log record of the other database transaction as a compensation record; otherwise buffering the received log record in at least one record buffer; repeating steps 1) and 2) for further received log records;
  3) using the tag data for replicating to a target database system of the system buffered log records of the record buffer which are not marked as compensation records.

BRIEF DESCRIPTION OF THE DRAWINGS

In the following embodiments of the invention are explained in greater detail, by way of example only, making reference to the drawings in which.

DETAILED DESCRIPTION

Figure 1:
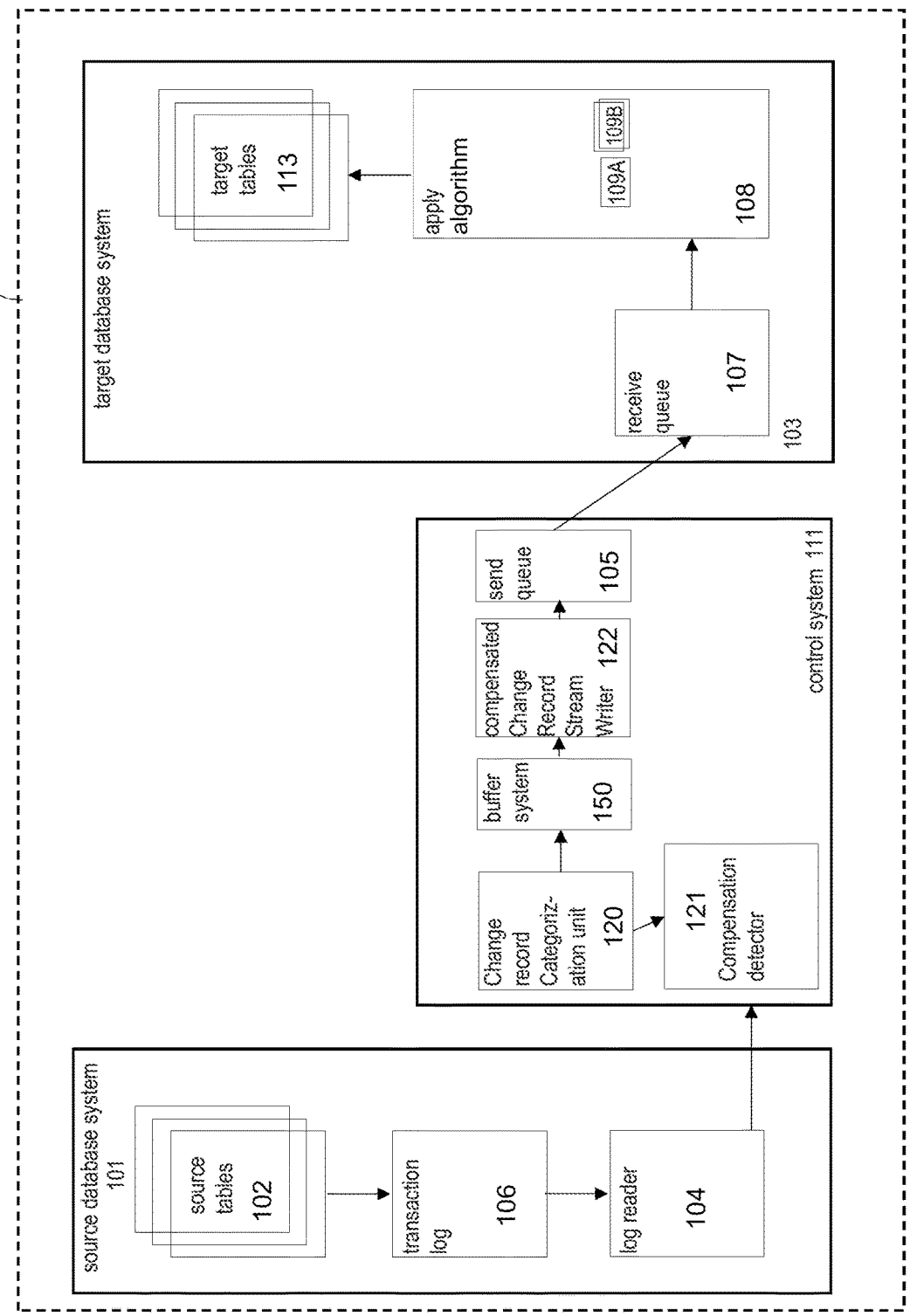
FIG. 1 is a block diagram of a data processing system in accordance with an embodiment of the invention.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, a first technique may require that a log stream is buffered in a staging area. The staging area is used to find compensation records and either remove them or replace them via the most recent version before applying the compensated changes to the target database. This frequent record lookups and in-memory replacement may cause significant overheads by random memory accesses, e.g., via a hash table. The present subject matter may improve the first technique and increase the efficiency of compensation and change application processes by avoiding random memory accesses. The log stream is buffered in-memory in accordance with the present subject matter and compensation records are not immediately processed, e.g., by overwriting or deleting nullified records, but compensation records are tracked separately to mark nullified records as logically deleted. Once buffered changes are applied, logically deleted records are skipped. The present subject matter may thus enable sequential memory access patterns, which may be cache friendly and lead to efficient I/O operations. For example, an insertion I of a record followed by a deletion D (noted by I–>D) of the same record may be executed by two independent transactions that are separately committed. Applying each of the two transactions separately to the target database has the same effect as if the record was never inserted. The same also holds true for the following combination of compensating operations when applied on a same record: I–>U, I–>I', D–>D', U–>U'. This net-effect may be utilized by the present subject matter to buffer the log record stream, identify compensation records and skip them when applying the buffered changes to the target database.

For example, the method may be performed by a control system that is remotely connected to the source database system and the target database system. This may enable a remote control of the data synchronization and a centralized control of multiple pairs of source and target database systems. The control system may provide a third-party service that can be used by normal users. Instead of requiring resources at both the source and target systems, the present subject matter enables to centralize the computing efforts at one point. Also, using a remote-control system to control the data synchronization processes in the system may minimize the amount of pre-installations and configurations. The control system may for example comprise a compensation detector component that can be queried whether a newly received log record compensates a previously buffered log record for the same data record. The compensation detector may for example build an index, e.g., a hash table storing the log record's identifying attributes, over the buffered log records for implementing the change detection. The compensation detector may read the record buffers for implementing a change detection such that in case a new log record compensates a previously buffered one, the latter is returned by the compensation detector. If the compensation detector returns a compensation record, a descriptor of the compensation record may be inserted into the compensation buffer in order to mark the log record as logically deleted. Otherwise, the new log record may be inserted into the corresponding record buffer.

The repeating of receiving steps b) and determining step c) for further received log records may be performed until a predefined number of log records is processed e.g. 1000, or until all log records are processed or until a predefined time period is lapsed e.g. steps b) to c) may be repeated for one hour and after that repetition, step d) is performed. The log record of the other database transaction that is marked as a compensation record is a log record, of the at least one log record, that is associated with the change (i.e. it is a log record that comprises log information of the change) that is rolled back. A database transaction may refer to a unit of work performed against a database and treated in a coherent and reliable way independent of other transactions. A database transaction generally represents any change in a database. For example, a database transaction may be issued to the database system in a language like SQL wrapped in a transaction, using a pattern similar to the following: s1) Begin the transaction, s2) Execute a set of data manipulations and/or queries, s3) If no errors occur then commit the transaction and end it and s4) If errors occur then roll back the transaction and end it. A transaction commit operation applies all data manipulations within the scope of the transaction and persists the results to the database. The processing step of the database transaction as described herein may be the steps s1) and s2) of the pattern, while the application step is the commit of the transaction so as to end it.

A log record refers to log information descriptive of a change induced by one or more operations of database transaction performed on one or more data records of a source table of a database. For example, the log information is provided such that it can be used by the target database system to apply the same change on a target table that corresponds to the source table, e.g., if before applying the change to the source table, both the source and target tables have the same content, the log information may be provided such that the same change can be applied on the target table and the resulting target table has the same content as the changed source table by said change. The log information may, for example, comprise general log attributes and other attributes depending on the type of change associated with the log record. The general log attributes may, for example, comprise a log record sequence number (LRSN) which is a unique ID for a log record indicating the logical order of the change, a transaction ID number which is a reference to the database transaction generating the log record. The other attributes may comprise, for example, for an update change type, a page ID indicating the Page ID of the modified page, a length and offset of the page, before and after images which include the value of the bytes of page before and after the page change. The page may comprise one or more data records of the database. The before and after images may comprise values of that one or more data records before and after the change is applied respectively. Each data record that is referenced by the log record may be comprised of multiple attributes. Said data record may be uniquely identified, e.g., via an ID attribute, a set of key attributes in the corresponding database table, etc.

For example, the data analysis system may be a data warehousing system or master data management system. The data analysis system may enable data warehousing or master data management or another technique that uses a source and target database systems, wherein the target database system comprises a target database that is configured to receive/comprise in accordance with technique a copy of a corresponding source database of the source system. The source database system may be connected to the target database system via a connection. The connection may for example be a TCP/IP connection or another connection enabling the communication of data via the connection between the source database and the target database system. The source database system may be a transactional engine and the target database system may be an analytical engine. For example, the source database system may be an online transaction processing (OLTP) system and the target database system may be an online analytical processing (OLAP) system.

According to one embodiment, the method further comprises buffering the received log record in the record buffer regardless of the log record of the other database transaction being marked as a compensation record, and buffering in the compensation buffer tag data indicative of the received log record, thereby marking the received log record as a compensation record. This may result in all received log records being buffered in the record buffer. This may be advantageous in case all the received log records need to be processed before replication. The present subject matter may skip (or not replicate) the received log record if it is marked as a compensation record.

According to one embodiment, the at least one record buffer comprises multiple record buffers, the buffering of the log record comprising: categorizing the log record depending on the type of the operation performed by the database transaction that generated said log record, selecting a record buffer of the record buffers depending on the category of the log record, and performing the buffering of the log record in the selected record buffer. The type of operations may be an insert, delete or update operation. By having separate buffers for each type of operations, this embodiment may enable that transactions can be replicated and processed independently which may increase the flexibility and thus the efficiency of the data replication.

According to one embodiment, the record buffers comprise an insert buffer for storing log records generated by database transactions comprising insert operations and a delete buffer for storing log records generated by database transactions comprising delete operations. This may be advantageous as most of operations can be decomposed into an insert and delete operation. For example, an update operation may be a combination of delete and insert operations. By providing a separate insert and delete buffer only, this embodiment may enable a compact buffer implementation while still enabling independent processing of transactions.

According to one embodiment, the buffering of the log records is performed in a predefined order, wherein the replicating of the buffered log records comprises extracting the log records from the record buffers in accordance with the predefined order. The predefined order may be the order in which the changes occur in the source database system. This embodiment may enable a consistent database content over time between the source and target database systems. For example, if change1 occurred at time t1 before change2 at time t2 on respective table1 and table2, and if change2 is first executed on the target side, the content of the database of the target database system is not consistent with the content of the database of the source database system neither at t1 nor at t2. Only once the change1 is executed, that the content of the database of the target database system is consistent with the content of database of the source database system at time t2. However, if change1 is first applied at the target database system, the content of the database of target database system is consistent with the content of database of the source database system already at time t1. And after applying change2, the content of the database of target database system is again consistent with the content of database of the source database system at time t2.

According to one embodiment, the predefined order being an order defined by the log record sequence number, LRSN, of the log records. This may enable a seamless integration of the present method with existing systems. Using LRSNs may save processing resources that would otherwise be required for implementing a new numbering scheme for buffered log records.

According to one embodiment, the record buffer stores the log records in accordance with a priority queue, sorted list, or any other data structure that allows to implement an extraction of the log records in a desired output order. The desired output order may, for example, be the order defined by the LRSN. This may enable a controlled access to buffered data. In another example, the desired output order may be application and/or transaction type dependent. For example, the output order may require that independent transactions of insert type are first ordered, followed by delete transaction operations etc. In another example, transactions of a given application may be first ordered followed by transactions of another application (i.e. the transactions of the given application have a higher priority e.g. because the given application is administrator/system application). This may enable a controlled and efficient data synchronization processes. For example, the order of extraction may be defined so as to render the data synchronization more efficient.

According to one embodiment, the buffering of the tag data is performed in the predefined order. This may for example enable to identify compensation records by the order of reading the compensation buffer. This may save resources of implementing mappings between the tag data and buffered records.

According to one embodiment, the method further comprises creating a hash table mapping the buffered log records to identifiers of respective data records, wherein the determining that the received log record is generated by the database transaction that rolls back a change of another database transaction comprises using the identifier of a data record of the received log record for determining if a log record is mapped to that identifier in the hash table, and if so determining using the buffered log record to identify the another database transaction. The data record of a log record may be a record of a table that is affected by the database transaction that generated the log record. A data record or row is a collection of related data items such as a name, date of birth and class of a particular user. A record represents an entity, wherein an entity refers to a user, object, or concept about which information is stored in the data record. The data records may be stored in a graph database as entities with relationships, where each data record may be assigned to a node or vertex of the graph with properties being attribute values such as name, date of birth etc. The data records may, in another example, be data records of a relational database.

Log records may be extracted from the record buffers in the same order that was used for inserting them. If blocks containing the log records have been spilled to a disk, they may be read back into main memory before extracting the next log record. The order of the log records may be derived from the logical ordering attribute used in the logging process, such as LRSN. The record buffer may store the log records in accordance with a priority queue, sorted list, or any other data structure that allows to implement an efficient extraction of the log records in a desired output order. If multiple buffers exist, the next record will be selected from the buffer that stores the log record occurred before the others in the original log stream. On extraction from a buffer, a log record may be skipped, proceeding with the next one. Whether a log record should be skipped may be derived from the compensation record descriptors stored inside the compensation buffer.

According to one embodiment, databases of the source database system have a record data structure that is different from record data structure of databases of the target database system, the buffering in the record buffer comprising transforming the data structure of one or more data records of the log record, resulting in a transformed log record, and buffering the transformed log record. For example, the data in the source database system may be stored in a row format and the data stored in the target database system may be stored in a column format. The transformation may for example be performed so as to transform the format from a row to column format. By converting the format of the data records at this stage, the application of the log records at the target database system may require fewer processing resources that would otherwise be required if the said data records are to be transformed at the target database system. The conversion also enables to perform the data replication n e.g. without such a conversion the application of log records at the target database system may fail.

According to one embodiment, the tag data of a log record comprises at least one of the positions of the log record inside the record buffer and a record length of the log record. The tag data may, for example, be a data descriptor (or descriptor) which is a structure containing information that describes and identifies a log record.

FIG. 1 is a block diagram of a data processing system (or data analysis system) 100 in accordance with an example of the present subject matter. The data processing system 100 may be configured for data synchronization between a source database system 101 and target database system 103 in accordance with an example of the present subject matter. The source database system 101 may, for example, be an online transaction processing (OLTP) system. The target database system 103 may for example, be online analytical processing (OLAP) system. In one example, the data processing system 100 may be a CDC system 100.

The source database system 101 comprises one or more source tables 102, a transaction log 106, and a log reader 104. Source tables 102 can be relational tables in DB2® for z/OS®, DB2 for Linux, UNIX, and Windows, and Oracle. The transaction log 106 is maintained by the source database system 101 for its own recovery purposes.

The target database system 103 comprises a receive queue 107, an apply program 108, and one or more target tables 113. The apply program 108 includes a browser thread 109A and multiple agent threads 109B. The agent threads 109B may be used for processing transactions at the target database system 103.

The browser thread 109A may be configured to get messages from receive queue 107 and pass the messages to one or more agent threads 109B to be applied to the target the database system 103. The receive queue 107 may be populated with submitted log records of the source database system 101 and is to be used as the source of changed data to be applied to target tables 113 of the target database system 103.

The entries or log records of the transaction log 106 describe changes to rows of the source tables 102 at the source database system 101. More specifically, the entries in the transaction log 106 may, for example, contain information defining (1) the table being changed, (2) the value of the key column in the row being changed, (3) the old and new values of all columns of the changed row, and (4) the transaction (unit of work) causing the change. By definition, an insert is a new data record and, therefore, has no old values. For delete changes, there is by definition no new data record, only an old data record. Thus, transaction log entries for inserted rows may contain only new column values while transaction log entries for deleted rows may contain only old column values. Transaction log entries for updated rows may contain the new and old values of all row columns. The order of entries in the transaction log reflects the order of change operations of the transactions and the order of transaction commit records reflects the order in which transactions are completed. The type of row operations in transaction log records can be delete, insert, or update.

The log reader 104 is configured to read log records of transactions from the transaction log 106. Changes to the tabular data at the source tables 102 are to be replicated to corresponding target tables 113. The replication in accordance with the present subject matter provides low impact capture and fast delivery of data changes for key information management initiatives including dynamic data warehousing, master data management, application consolidations or migrations, operational BI, and enabling SOA projects. The replication also helps reduce processing overheads and network traffic by only sending the data that has changed. Replication can be carried out periodically.

The log reader 104 may further be configured to provide the read log records to a control system 111. A change record categorization unit 120 of the control system 111 may be configured to categorize the received log record depending on the type of the operation performed by the database transaction that generated said log record. The change record categorization unit 120 may further be configured to determine using a compensation detector 121 if the categorized log record is generated by a database transaction that rolls back a change of another database transaction. If the categorized log record is generated by a database transaction that rolls back a change of another database transaction, the change record categorization unit 120 is configured to buffer in a buffer system 150 tag data indicative of a log record generated by the other database transaction. This may enable to mark that log record as a compensation record. That is, marking that log record as a compensation log record comprises buffering in the buffer system 150 tag data indicative of the log record. A compensated change record stream writer 122 may be configured to use the tag data for replicating to the target database system 103 buffered log records of the buffer system 150 which are not marked as compensation records. The compensated change record stream writer 122 may, for example, send the buffered log records which are not marked as compensation records via logical message units on recoverable queues such as send queue 105 and receive queue 107. For example, IBM MQ may be used for the messaging. IBM MQ can transport any type of data as messages, enabling to build flexible, reusable architectures such as service-oriented architecture (SOA) environments.

The control system 111 is shown as part of the data processing system 100 for exemplification purpose. In another example, the control system 111 may be a remote system of the data processing system 100. For that, the control system 111 may be configured to connect to the data processing system 100 via a medium of wireline and/or wireless digital data communication, e.g., a communication network. Examples of communication networks include a local area network (LAN), a wide area network (WAN), a wireless local area network (WLAN), all or a portion of the Internet, and/or any other communication system or systems at one or more locations. For example, the control system 111 may be configured to connect to the source database system 101 and to the target database system 103 as a system administrator of the source computing system 101 and the target database system 103 respectively.

Figure 2:
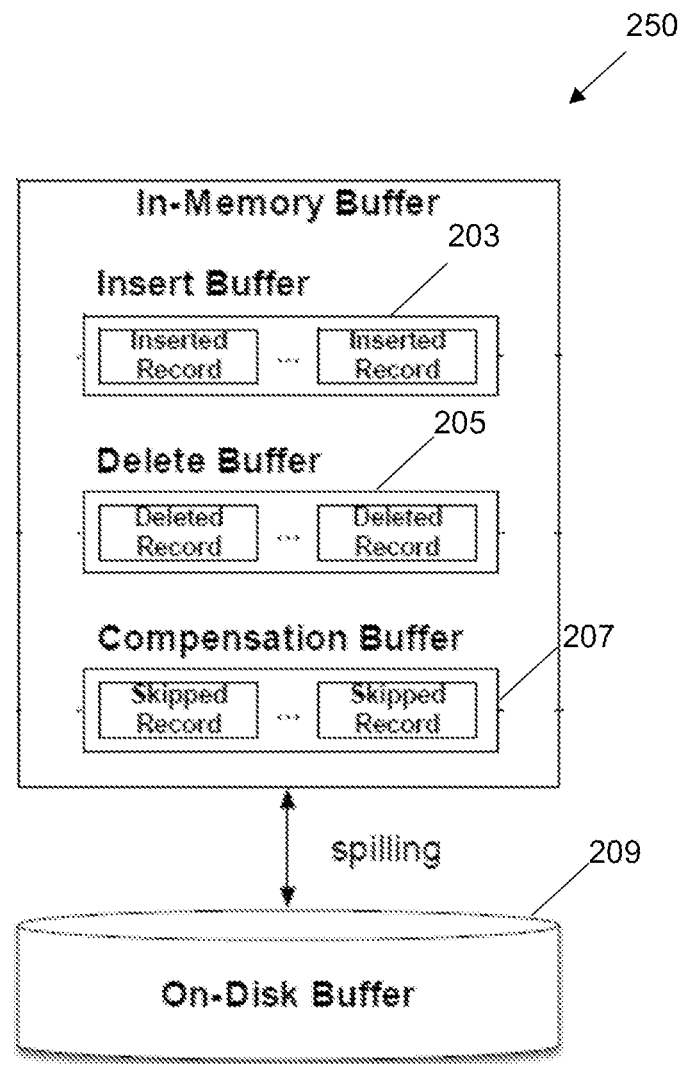
FIG. 2 is a diagram of a buffer system in accordance with an embodiment of the invention.

FIG. 2 is a diagram of a buffer system 250 such as the buffer system 150 in accordance with an example of the present subject matter.

The buffer system 250 comprises an in-memory buffer 201 of a main memory. The in-memory buffer 201 comprises multiple record buffers 203 and 205 for buffering log records and a compensation buffer 207 for separately buffering the tag data. Separate buffers may be maintained for inserted and deleted log record types, but alternative implementations may be possible. For example, other buffer types may be implemented for other change record types.

The record buffers comprise an insert buffer 203 for buffering log records generated by database transactions comprising insert operations. The record buffers further comprise a delete buffer 205 for buffering log records generated by database transactions comprising delete operations. Each record buffer may store log records in a format that can be used to apply it to the target database system, e.g., in binary format. By temporarily buffering log records during replication the impact to the target database when applying to column-organized tables may be minimized. On extraction from a record buffer 203 and 205, a log record may be skipped, proceeding with the next one. Log records inside a record buffer 203 or 205 may not be overwritten or deleted. The record buffers 203 and 205 are append-only. The record buffers 203 and 205 are flushed by applying the log records to the target database system.

Whether a log record should be skipped may be derived from the compensation record's tag data stored inside the compensation buffer 207. For example, the compensation buffer 207 may store descriptors for each log record that is marked as logically deleted/compensated. Each descriptor may store the minimum information to identify the log record, e.g., the attribute ID, the set of key attributes, etc. Each descriptor may store additional information to support skipping log records when extracting them from the record buffers, e.g., the position/offset of the log record inside the buffer, a record length, etc. Descriptors from the compensation buffer may be directly looked up given a next log record for which it needs to be checked whether it should be skipped. For example, a hash table may be used to implement such lookups. Alternatively, the compensation buffer may also be processed like the log record buffers, leveraging an ordering of descriptors similar to ordering of log records.

The record buffers 203 and 205 may have associated data structures such as a priority queue, sorted list, or any other data structure that allows to implement an extraction of the log records from the record buffers 203 and 205 in a desired output order. For example, each record buffer is an allocated piece of storage with some structure associated with it.

Each record buffer may be comprised of multiple blocks that store the log records. The buffer system 250 further comprises an on-disk buffer 209. This may for example enable that each block may be spilled to the disk 209 in case the buffer's capacity of one of the record buffers is exceeded. If blocks containing the log records have been spilled to the disk 209, they may be read back into main memory before extracting the next record.

Figure 3:
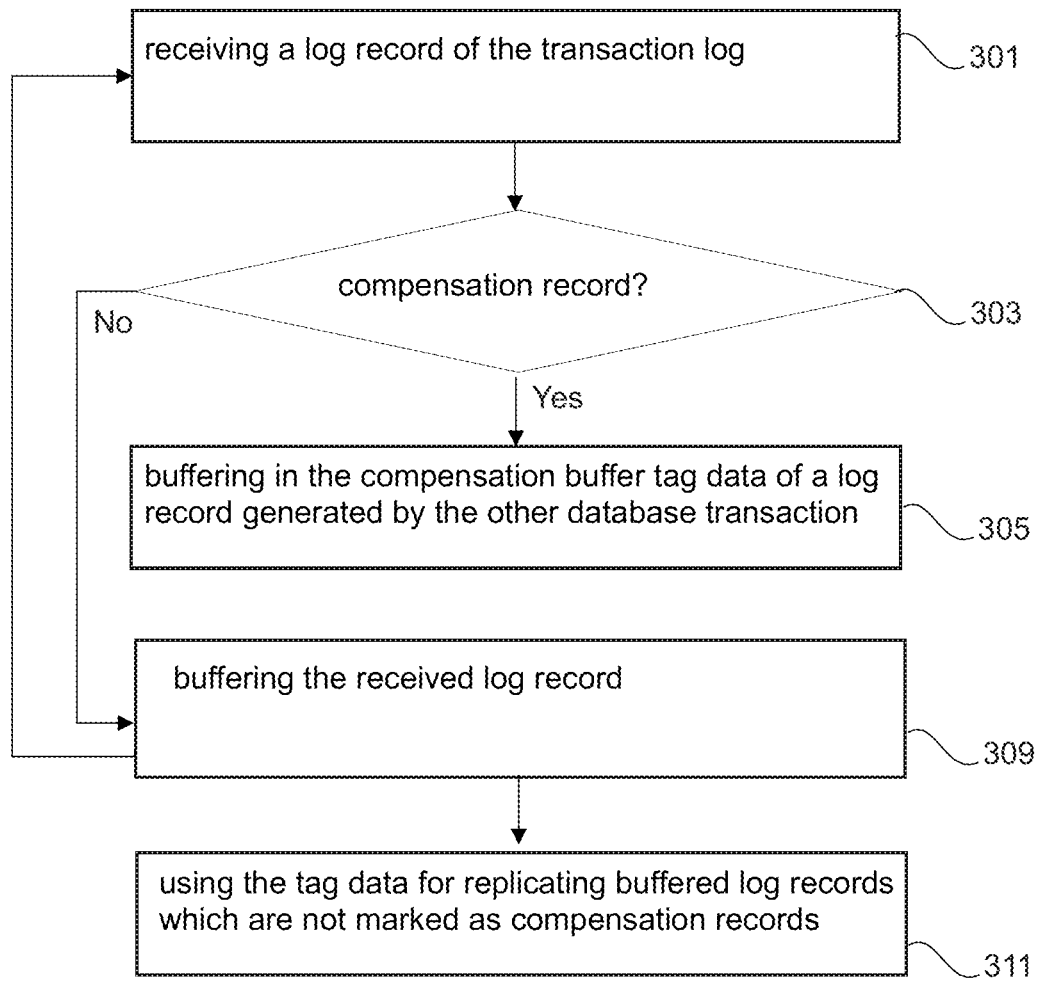
FIG. 3 is a flowchart of a method for data replication in a CDC system in accordance with an embodiment of the invention.

FIG. 3 is a flowchart of a method for data synchronization between a source database system and target database system of a data analysis system, e.g., 100.

In step 301, a log record of the transaction log 106 may be received. The log record may be received as part of a log stream. A log stream may be a series of log records that is received during a given time interval. The log stream may be identified by its own (unique) log stream identifier, such as the log stream name.

In inquiry step 305, it may be determined if the received log record is generated by a database transaction that rolls back a change of another database transaction whose at least one log record is buffered in the record buffer. For example, in case an insert transaction of a value in a given row followed by a deleted transaction of that value from that row, the delete transaction rolls back (undo) the change caused by the insert transaction or the received log record compensates a buffered log record of the other database transaction. For example, if the received log record LR2 is generated or is the result of a transaction T2 and the transaction T2 rolls back the change of another database transaction T1, wherein T1 has a log record LR1 that comprises log information indicative of said change. LR1 may be marked as a compensation record of LR2, by adding tag data descriptive or indicative of LR2 in the compensation buffer. Step 305 may, for example, be performed by querying a compensation detector, e.g., 121 whether the received log record compensates a previously buffered log record for the same one or more data records. The compensation detector 121 may, for example, build an index, e.g., a hash table storing the log record's identifying attributes, over the buffered log records, e.g., in record buffers 203 and 205, for implementing the change detection. The compensation detector may read the record buffers for implementing a change detection such that in case the received log record compensates a previously buffered one, the latter is returned by the compensation detector 121.

In response to determining that the received log record is generated by a database transaction that rolls back a change of another database transaction, tag data may be buffered in step 307 in a compensation buffer, e.g., 207. The tag data indicates one or more log records generated by the other database transaction. This enables to mark that log records as compensation records. For example, if the compensation detector returns a compensation record, a descriptor of the compensation record may be inserted into the compensation buffer in order to mark the log record as logically deleted. Otherwise, the new log record may be inserted into the corresponding record buffer 203 or 205.

In response to determining that the received log record is not generated by a database transaction that rolls back a change of another database transaction, the received log record may be buffered in step 309 in a record buffer. For example, if the received log record is generated by a database transaction that has an insert operation, the received log record may be buffered in the corresponding insert buffer 203. If the received log record is generated by a database transaction that has a delete operation, the received log record may be buffered in the corresponding delete buffer 205. This may enable that when the received log record is retrieved from the log stream, it is categorized and inserted into separate buffers for later processing. If a record buffer overflows, it can be spilled to disk until the changes are applied. Log records inside a record buffer are not overwritten or deleted. The record buffers are append-only until they are flushed by applying the change records to the target database.

Steps 301 to 309 may be repeated for each received log record of the log stream. For example, steps 301 to 309 may be repeated for a predefined maximum number for log records (e.g., 1000 log records). In another example, steps 301 to 309 may be repeated until at least one of the buffers 203, 205, and 207 is full. After that repetitions, step 311 may be performed. In step 311, the tag data may be used for replicating to the target database system 103, via buffered log records of the record buffers 203 and 205 which are not marked as compensation records. When applying change records to the target database via a compensated change record stream writer, insert and delete buffers are read in logical order of the changes, which may, for example, be given by a log record sequence number (LRSN). For each log record, it is checked via the compensation buffer whether it was marked as deleted/compensated. In case it was not compensated, it is applied to the target database system 103. Otherwise, it is skipped and the next record from the insert/delete buffer is processed. In one example, steps 301-309 may be performed using batch processing. In this batch processing, the log records of the transactions of a given time interval are collected into a group. The whole group (or batch) is then processed as a batch. The transactions may be grouped into a batch in step 301 for performing steps 303-309 on the batch. In one example, the batch processing may be defined by the number of database transactions that can be grouped together. For example, with a maximum batch size value of 64 KB, the batch might group two transactions of 32 KB each; another batch might group 32 transactions of 2 KB each. The result of using size constraint is better use of messaging bandwidth by sending messages that might average 64 KB in size.

The replication as enabled by steps 301 to 311 may be carried out periodically, e.g., the present method may automatically be executed for each received log stream having a different log stream name. This may, for example, be performed by capturing the changes using a batch transfer processing, wherein the batch can be configured to increase or decrease the frequency of data replication. This may enable to keep the source and target database systems synchronized on a regular basis. This may particularly be advantageous in case the system experiences frequent changes to large volumes of data.

Figure 4:
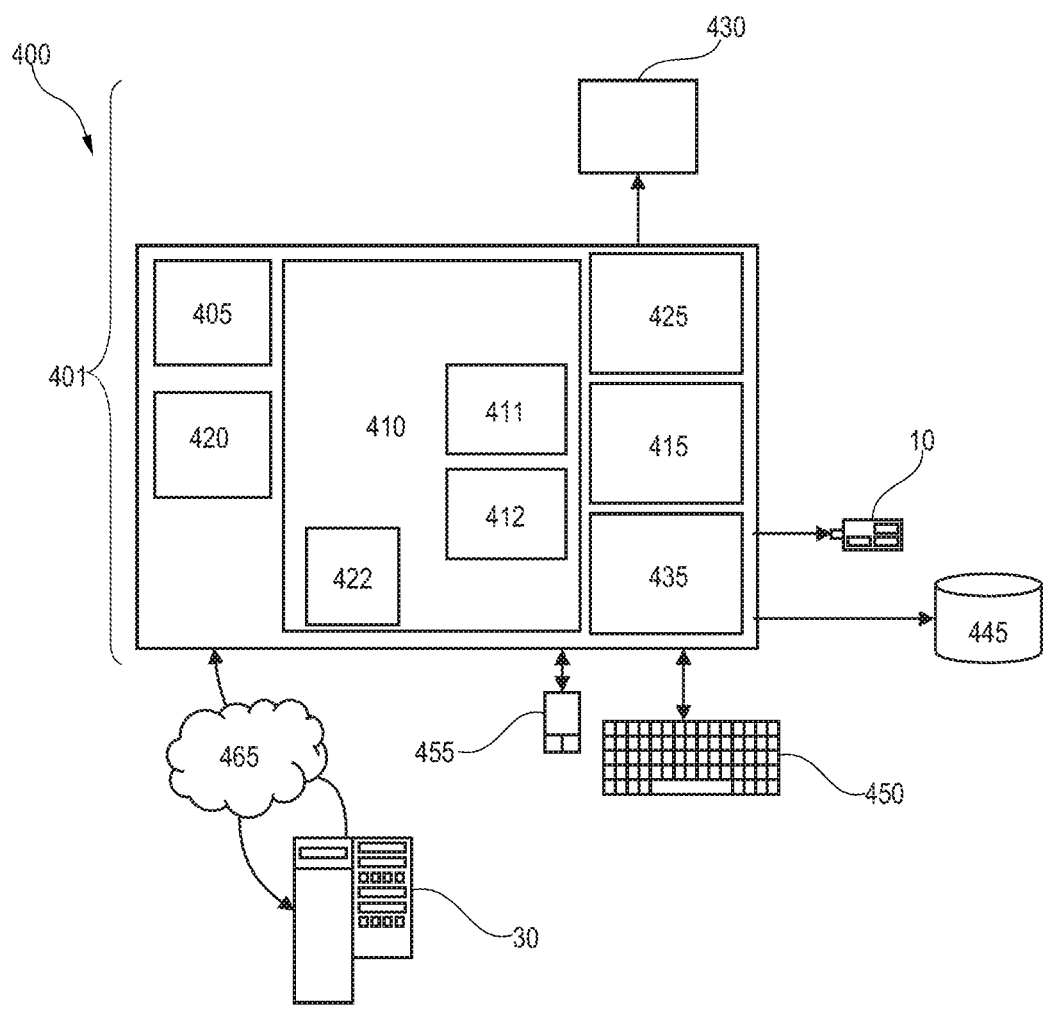
FIG. 4 represents a computerized system, suited for implementing one or more method steps as involved in accordance with an embodiment of the invention.

FIG. 4 represents a general computerized system 400 such as control system 111 suited for implementing at least part of method steps as involved in the disclosure.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software instructions 412, firmware 422, hardware (processor) 405, or a combination thereof. In exemplary embodiments, the methods described herein are implemented in software, as an executable program, and is executed by a special or general-purpose digital computer, such as a personal computer, workstation, minicomputer, or mainframe computer. The most general system 400 therefore includes a general-purpose computer 401.

In exemplary embodiments, in terms of hardware architecture, as shown in FIG. 4, the computer 401 includes a processor 405, memory (main memory) 410 coupled to a memory controller 415, and one or more input and/or output (I/O) devices (or peripherals) 10, 445 that are communicatively coupled via a local input/output controller 435. The input/output controller 435 can be, but is not limited to, one or more buses or other wired or wireless connections, as is known in the art. The input/output controller 435 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 445 may generally include any generalized cryptographic card or smart card known in the art.

The processor 405 is a hardware device for executing software, particularly that stored in memory 410. The processor 405 can be any custom made or commercially available processor, a central processing unit (CPU), an auxiliary processor among several processors associated with the computer 401, a semiconductor based microprocessor (in the form of a microchip or chip set), a macroprocessor, or generally any device for executing software instructions.

The memory 410 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 410 can have a distributed architecture, where various components are situated remote from one another, but can be accessed by the processor 405.

The software in memory 410 may include one or more separate programs, each of which comprises an ordered listing of executable instructions for implementing logical functions, notably functions involved in embodiments of this invention. In the example of FIG. 4, software in the memory 410 includes software instructions 412 e.g. instructions to manage databases such as a database management system.

The software in memory 410 shall also typically include a suitable operating system (OS) 411. The OS 411 essentially controls the execution of other computer programs, such as possibly software instructions 412 for implementing methods as described herein.

The methods described herein may be in the form of a source program, executable program (object code), script, or any other entity comprising a set of software instructions 412 to be performed. When a source program, then the program needs to be translated via a compiler, assembler, interpreter, or the like, which may or may not be included within the memory 410, so as to operate properly in connection with the OS 411. Furthermore, the methods can be written as an object-oriented programming language, which has classes of data and methods, or a procedure programming language, which has routines, subroutines, and/or functions.

In exemplary embodiments, a conventional keyboard 450 and mouse 455 can be coupled to the input/output controller 435. Other output devices such as the I/O devices 10, 445 may include input devices, for example but not limited to a printer, a scanner, microphone, and the like. Finally, the I/O devices 10, 445 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 445 can be any generalized cryptographic card or smart card known in the art. The system 400 can further include a display controller 425 coupled to a display 430. In exemplary embodiments, the system 400 can further include a network interface for coupling to a network 465. The network 465 can be an IP-based network for communication between the computer 401 and any external server, client and the like via a broadband connection. The network 465 transmits and receives data between the computer 401 and external systems 30, which can be involved to perform part, or all of the steps of the methods discussed herein. In exemplary embodiments, network 465 can be a managed IP network administered by a service provider. The network 465 may be implemented in a wireless fashion, e.g., using wireless protocols and technologies, such as WiFi, WiMax, etc. The network 465 can also be a packet-switched network such as a local area network, wide area network, metropolitan area network, Internet network, or other similar type of network environment. The network 465 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 401 is a PC, workstation, intelligent device or the like, the software in the memory 410 may further include firmware 422 which may include a basic input output system (BIOS). The BIOS is a set of essential software routines that initialize and test hardware at startup, start the OS 411, and support the transfer of data among the hardware devices. The BIOS is stored in ROM so that the BIOS can be executed when the computer 401 is activated.

When the computer 401 is in operation, the processor 405 is configured to execute software instructions 412 stored within the memory 410, to communicate data to and from the memory 410, and to generally control operations of the computer 401 pursuant to the software. The methods described herein and the OS 411, in whole or in part, but typically the latter, are read by the processor 405, possibly buffered within the processor 405, and then executed.

When the systems and methods described herein are implemented in software instructions 412, as is shown in FIG. 4, the methods can be stored on any computer readable medium, such as storage 420, for use by or in connection with any computer related system or method. The storage 420 may comprise a disk storage such as HDD storage.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for data replication in a data analysis system, wherein the data analysis system comprises a source database system, and wherein the source database system comprises a transaction log, and wherein log records generated by database transactions are stored in the transaction log, the method comprising:
   providing at least one record buffer, of multiple record buffers of a main memory, and a compensation buffer, wherein the multiple record buffers are separated based on an operation type, and wherein the multiple record buffers comprise an append-only insert buffer and an append-only delete buffer;
   receiving a log record of the transaction log, wherein the log record comprises log information comprising a page ID of a page which has been modified, before and after images which include values of bytes of the page before and after a page change, and wherein the page comprises one or more data records of the source database system, and wherein the before and after images comprise values of the one or more data records before and after the page change is applied;
   in response to determining that the received log record is generated by a database transaction that rolls back a change of another database transaction with at least one log record buffered in the at least one record buffer, buffering, in the compensation buffer, tag data indicative of a log record generated by the other database transaction and marking the log record of the other database transaction as a compensation record;
   in response to determining that the received log record is not generated by a database transaction that rolls back a change of another database transaction with at least one log record buffered in the at least one record buffer, buffering the received log record in the at least one record buffer; and
   replicating, based on the tag data and the log information, to a target database system, of the data analysis system, buffered log records of the record buffer which are not marked as compensation records.

2. The computer-implemented method of claim 1, wherein the buffering of the log record further comprises:
   categorizing the log record depending on a type of an operation performed by the database transaction that generated the log record;
   selecting a record buffer of the multiple record buffers depending on a category of the log record; and
   performing the buffering of the log record in the selected record buffer of the multiple record buffers.

3. The computer-implemented method of claim 1, wherein the append-only insert buffer stores log records generated by database transactions comprising insert operations, and wherein the append-only delete buffer stores log records generated by database transactions comprising delete operations.

4. The computer-implemented method of claim 1, further comprising:
   buffering in the compensation buffer until a predefined ending condition is met, wherein the predefined ending condition comprises one of: at least one of the record and compensation buffers is full, or a number of received log records reaches a predefined maximum number.

5. The computer-implemented method of claim 1, wherein replicating, based on the tag data, to a target database system buffered log records of the record buffer which are not marked as compensation records is repeated on a periodic basis.

6. The computer-implemented method of claim 1, wherein the buffering of the log records is performed in a predefined order, and wherein the replicating of the buffered log records comprises extracting the log records from the record buffers in accordance with the predefined order.

7. The computer-implemented method of claim 6, wherein the predefined order is defined by a log record sequence number, LRSN, of the log records.

8. The computer-implemented method of claim 1, wherein the record buffer stores the log records in a priority queue, a sorted list, or any other data structure that allows for extraction of the log records in a desired output order.

9. The computer-implemented method of claim 6, wherein the buffering of the tag data is performed in the predefined order.

10. The computer-implemented method of claim 1, further comprising creating a hash table mapping the buffered log records to identifiers of respective database records, wherein the determining that the received log record is generated by the database transaction that rolls back a change of another database transaction comprises using an identifier of a database record of the received log record to determine if a log record is mapped to that identifier in the hash table, and if so determining using the buffered log record to identify the another database transaction.

11. The computer-implemented method of claim 1, wherein databases of the source database system have a record data structure that is different from a record data structure of databases of the target database system, the buffering in the record buffer comprising transforming the data structure of the database record of the log record, resulting in a transformed log record, and buffering the transformed log record.

12. The computer-implemented method of claim 1, wherein the tag data of a log record comprises at least one of the positions of the log record inside the record buffer, and a record length of the log record.

13. A computer program product for data replication in a data analysis system, wherein the data analysis system comprises a source database system, and wherein the source database system comprises a transaction log, and wherein log records generated by database transactions are stored in the transaction log, the computer program product comprising:
  one or more non-transitory computer-readable tangible storage devices and program instructions stored on at least one of the one or more non-transitory computer-readable tangible storage devices, wherein the program instructions are executable by a computer, the program instructions comprising:
    program instructions to receive a log record of the transaction log, wherein the log record comprises log information comprising a page ID of a page which has been modified, before and after images which include values of bytes of the page before and after a page change, and wherein the page comprises one or more data records of the source database system, and wherein the before and after images comprise values of the one or more data records before and after the page change is applied;
    program instructions to determine that the received log record is generated by a database transaction that rolls back a change of another database transaction;
    in response to determining that the received log record is generated by a database transaction that rolls back a change of another database transaction, program instructions to buffer, in a compensation buffer, tag data indicative of a log record generated by the other database transaction whose at least one log record is buffered in the at least one record buffer and program instructions to mark the log record of the other database transaction as a compensation record;
    in response to determining that the received log record is not generated by a database transaction that rolls back a change of another database transaction, program instructions to buffer the received log record in at least one record buffer, of multiple record buffers of a main memory, wherein the multiple record buffers are separated based on an operation type, and wherein the multiple record buffers comprise an append-only insert buffer and an append-only delete buffer; and
    program instructions to replicate, based on the tag data and the log information, to a target database system, of the data analysis system, buffered log records of the record buffer which are not marked as compensation records.

14. A computer system for data replication in a data analysis system, the computer system comprising:
  a source database system, wherein the source database system comprises a transaction log, and wherein log records generated by database transactions are stored in the transaction log;
  one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:
    program instructions to receive a log record of the transaction log, wherein the log record comprises log information comprising a page ID of a page which has been modified, before and after images which include values of bytes of the page before and after a page change, and wherein the page comprises one or more data records of the source database system, and wherein the before and after images comprise values of the one or more data records before and after the page change is applied;
    program instructions to determine that the received log record is generated by a database transaction that rolls back a change of another database transaction;
    in response to determining that the received log record is generated by a database transaction that rolls back a change of another database transaction, program instructions to buffer, in a compensation buffer, tag data indicative of a log record generated by the other database transaction whose at least one log record is buffered in the at least one record buffer and program instructions to mark the log record of the other database transaction as a compensation record;
    in response to determining that the received log record is not generated by a database transaction that rolls back a change of another database transaction, program instructions to buffer the received log record in at least one record buffer, of multiple record buffers of the one or more computer-readable memories, wherein the multiple record buffers are separated based on an operation type, and wherein the multiple record buffers comprise an append-only insert buffer and an append-only delete buffer; and
    program instructions to replicate, based on the tag data and the log information, to a target database system, of the data analysis system, buffered log records of the record buffer which are not marked as compensation records.

15. The computer system of claim 14, being remotely connected to the source database system and to the target database system.

16. The computer system of claim 14, wherein the source database system implements a change data capture system.

17. The computer system of claim 14, wherein the target database system implements a change data capture system.

* * * * *